No. 652,398. Patented June 26, 1900.
A. MAJOR.
ICE RECEPTACLE.
(Application filed Jan. 16, 1899.)
(No Model.)
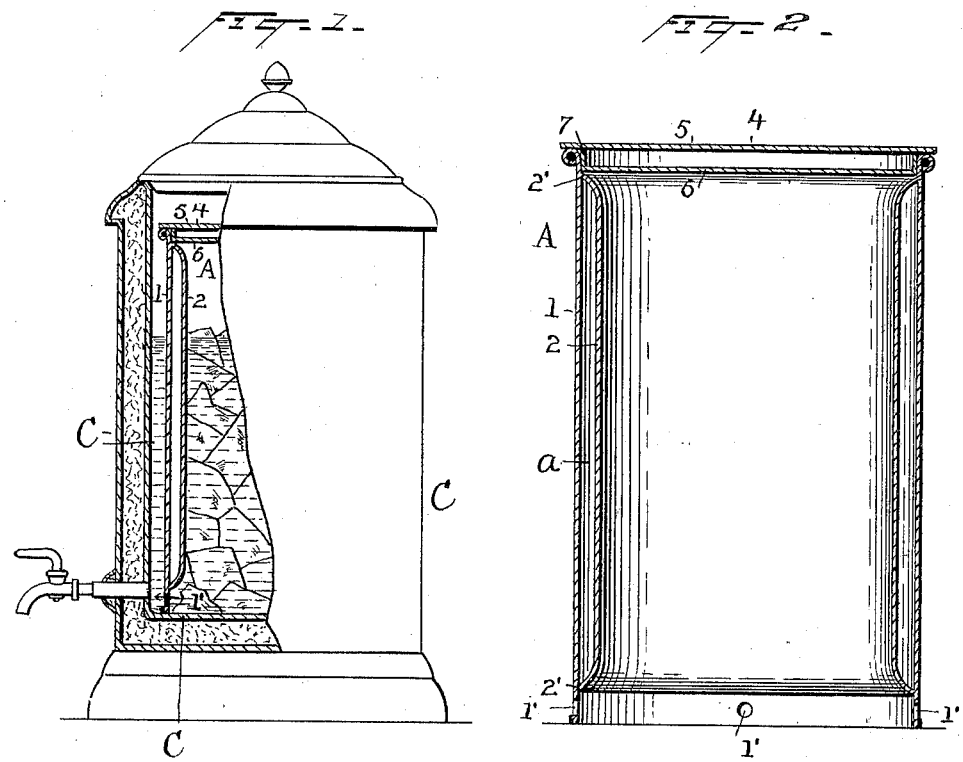
WITNESSES
Emma H. Finlayson
Mary A. Derringer
INVENTOR
Alphonse Major
By Norris H. Clark
his ATTY

UNITED STATES PATENT OFFICE.

ALPHONSE MAJOR, OF NEW YORK, N. Y.

ICE-RECEPTACLE.

SPECIFICATION forming part of Letters Patent No. 652,398, dated June 26, 1900.

Application filed January 16, 1899. Serial No. 702,241. (No model.)

*To all whom it may concern:*

Be it known that I, ALPHONSE MAJOR, a citizen of the United States of America, and a resident of New York city, county and State of New York, have invented certain new and useful Improvements in Ice-Receptacles, of which the following is a specification.

This invention relates to ice-receptacles, and aims to provide a receptacle which can be used in connection with any ordinary water-cooler or similar device to cool the water and bring it to a proper temperature for drinking.

The principal object of my invention is to make a receptacle having a dead-air space. With this air-space I accomplish several great advantages over the ordinary cooler. It keeps the water at a cold-spring temperature and also prevents the ice from melting as fast as in ordinary coolers, thus saving about forty per cent. of ice. The receptacle is very compact, being of less diameter than the cooler in which it is placed, thus affording very little space for the ice and water to move about, which prevents the water from splashing from the cooler when used on railroad-cars.

My invention is illustrated in the accompanying drawings, in which—

Figure 1 is an elevation of an ice-cooler, partly broken away to show the receptacle. Fig. 2 is a section of the receptacle.

A is the receptacle, composed of an outer shell or vessel 1 and an inner shell 2, said vessel being soldered together at the upper and lower end at 2' to form a dead-air space $a$ around the entire vessel. The lower end of the receptacle is open, which allows the ice and water to rest on the bottom of the cooler C. Openings 1' around the lower edge of the receptacle A allow the water to flow out of the receptacle into the cooler. The water which flows into the cooler is about twelve degrees warmer than that which remains in the receptacle, thus bringing the water in the cooler to a cold-spring temperature. The water in the receptacle A being of much lower temperature prevents the ice from melting as fast as in an ordinary cooler, thus saving about forty per cent. of ice. A cover 4 is placed over the top to exclude the air from the vessel, said cover being composed of a double head 5 and 6, soldered together at the outer edge 7 to form a dead-air space between the heads 5 and 6, thus preventing air from entering the receptacle.

The receptacle is preferably made of galvanized iron, so as to provide weight enough to allow the same to rest on the bottom of the cooler when filled with ice-water. The receptacle can be placed in any ordinary cooler.

The shells 1 and 2 have a concentric arrangement, the inner shell being of less diametrical extent and length than the outer shell and having its end portions outwardly flared to meet the outer shell, to which it is secured in the manner set forth. By having the end portions of the shell 2 flared straight shoulders are obviated and the circulation of the water is facilitated. Moreover, sediment and other impurities are shed and have not the same tendency to accumulate which straight shoulders would afford. The lower end portions of the outer shell projecting below the inner shell constitutes a rest for the receptacle and avoids the necessity of perforating both shells to provide the circulating-openings. The inner shell terminating at its upper end short of the outer shell results in the receptacle having a maximum entrance for the ice and water, which is of material benefit, and the beveled or flaring terminal of the shell 2 directs any ice or water impacting thereon into the receptacle.

What I claim is—

1. In combination with a cooler provided with means for drawing off the liquid contents, an attachment loosely and removably fitted within the cooler through the open end thereof and comprising spaced shells, the terminal portions of the inner shell being outwardly flared and joined to the end portions of the outer shell a short distance from its extremities, the upper projecting portion of the outer shell forming a mouth and adapted to receive the depressed part of the cover and the lower projecting portion constituting a rest, substantially as specified.

2. An attachment for water-coolers readily insertible and removable through the open end thereof, the same comprising spaced concentric cylindrical shells, the inner shell having its end portions flared and joined to the end portions of the outer shell, and the latter having its terminal portions projected beyond the extremities of the inner shell to form, respectively, a mouth and a rest, the latter being perforated, substantially as described.

Signed by me at New York, N. Y., this 23d day of December, 1898.

ALPHONSE MAJOR.

Witnesses:
   EMMA W. FINLAYSON,
   N. A. CLARK.